United States Patent
Jiang

(10) Patent No.: US 9,099,947 B2
(45) Date of Patent: Aug. 4, 2015

(54) DEVICE FOR RECOVERING ELECTRIC ENERGY IN DC MOTOR-DRIVEN ELECTRIC VEHICLE

(71) Applicant: Xiaoping Jiang, Taizhou (CN)

(72) Inventor: Xiaoping Jiang, Taizhou (CN)

(*) Notice: Subject to any disclaimer, the term of this patent is extended or adjusted under 35 U.S.C. 154(b) by 134 days.

(21) Appl. No.: 13/952,687

(22) Filed: Jul. 29, 2013

(65) Prior Publication Data

US 2013/0307442 A1    Nov. 21, 2013

Related U.S. Application Data

(63) Continuation-in-part of application No. PCT/CN2011/081907, filed on Nov. 8, 2011.

(30) Foreign Application Priority Data

Feb. 11, 2011    (CN) .......................... 2011 1 0035958

(51) Int. Cl.
| | | |
|---|---|---|
| H02J 7/14 | (2006.01) | |
| H02P 7/06 | (2006.01) | |
| B60L 11/18 | (2006.01) | |
| H02J 7/02 | (2006.01) | |

(52) U.S. Cl.
CPC .............. *H02P 7/06* (2013.01); *B60L 11/1811* (2013.01); *H02J 7/02* (2013.01); *H02J 7/14* (2013.01); *H02J 7/1492* (2013.01); *Y02T 10/7005* (2013.01); *Y02T 10/92* (2013.01); *Y02T 90/127* (2013.01); *Y02T 90/14* (2013.01)

(58) Field of Classification Search
USPC ............... 318/139, 148, 400.3; 320/107, 109; 363/15, 132
See application file for complete search history.

(56) References Cited

U.S. PATENT DOCUMENTS

| | | | | |
|---|---|---|---|---|
| 4,237,371 | A * | 12/1980 | LeBouder | 377/2 |
| 5,350,994 | A * | 9/1994 | Kinoshita et al. | 320/116 |
| 5,514,915 | A * | 5/1996 | Kim et al. | 307/64 |
| 5,579,197 | A * | 11/1996 | Mengelt et al. | 361/93.4 |
| 5,654,621 | A * | 8/1997 | Seelig | 320/108 |
| 8,240,411 | B2 * | 8/2012 | Nakatsu et al. | 180/65.21 |
| 8,376,069 | B2 * | 2/2013 | Nakatsu et al. | 180/65.21 |
| 8,502,496 | B2 * | 8/2013 | Hofheinz | 320/104 |
| 8,692,512 | B2 * | 4/2014 | Tanikawa et al. | 320/109 |
| 2002/0141216 | A1 * | 10/2002 | Ishihara et al. | 363/132 |
| 2008/0211437 | A1 * | 9/2008 | Tamai et al. | 318/148 |
| 2009/0189581 | A1 * | 7/2009 | Lawson et al. | 323/282 |
| 2009/0251924 | A1 * | 10/2009 | Todd | 363/15 |
| 2010/0025126 | A1 * | 2/2010 | Nakatsu et al. | 180/65.1 |
| 2011/0181236 | A1 * | 7/2011 | Yang et al. | 320/107 |
| 2011/0227534 | A1 * | 9/2011 | Mitsutani | 320/109 |
| 2011/0273139 | A1 * | 11/2011 | Hofheinz | 320/109 |

(Continued)

*Primary Examiner* — Paul Ip

(74) *Attorney, Agent, or Firm* — Matthias Scholl P.C.; Matthias Scholl

(57) ABSTRACT

A device for recovering electric energy in a DC motor-driven electric vehicle. The device includes a battery; a first inverter; an inductor; a first rectifier bridge or a second inverter; a DC motor; a second rectifier bridge or a third inverter; and a charger. The anode and the cathode of the battery are connected to input ends of the first inverter, respectively. One output end of the first inverter is connected to one end of a primary coil of the inductor. Another output end of the first inverter is connected to one input end of the first rectifier bridge or the second inverter. Another end of the primary coil of the inductor is connected to another input end of the first rectifier bridge. The charger is connected to the anode and the cathode of the battery for supplying power from an external power supply.

12 Claims, 1 Drawing Sheet

(56) References Cited

U.S. PATENT DOCUMENTS

| | | | |
|---|---|---|---|
| 2011/0295456 A1* | 12/2011 | Yamamoto et al. | 701/22 |
| 2011/0309793 A1* | 12/2011 | Mitsutani | 320/109 |
| 2012/0043807 A1* | 2/2012 | Ichikawa | 307/9.1 |
| 2012/0068663 A1* | 3/2012 | Tanikawa et al. | 320/109 |
| 2012/0123625 A1* | 5/2012 | Ueo et al. | 701/22 |
| 2012/0218027 A1* | 8/2012 | Ioannidis | 327/513 |
| 2012/0218710 A1* | 8/2012 | Ioannidis | 361/697 |
| 2012/0221287 A1* | 8/2012 | Ioannidis | 702/132 |
| 2012/0221288 A1* | 8/2012 | Ioannidis | 702/136 |
| 2012/0275205 A1* | 11/2012 | Nakatsu et al. | 363/141 |
| 2012/0299377 A1* | 11/2012 | Masuda et al. | 307/10.1 |
| 2013/0033038 A1* | 2/2013 | Rozman et al. | 290/31 |
| 2014/0001988 A1* | 1/2014 | Kanzaki | 318/400.3 |

* cited by examiner

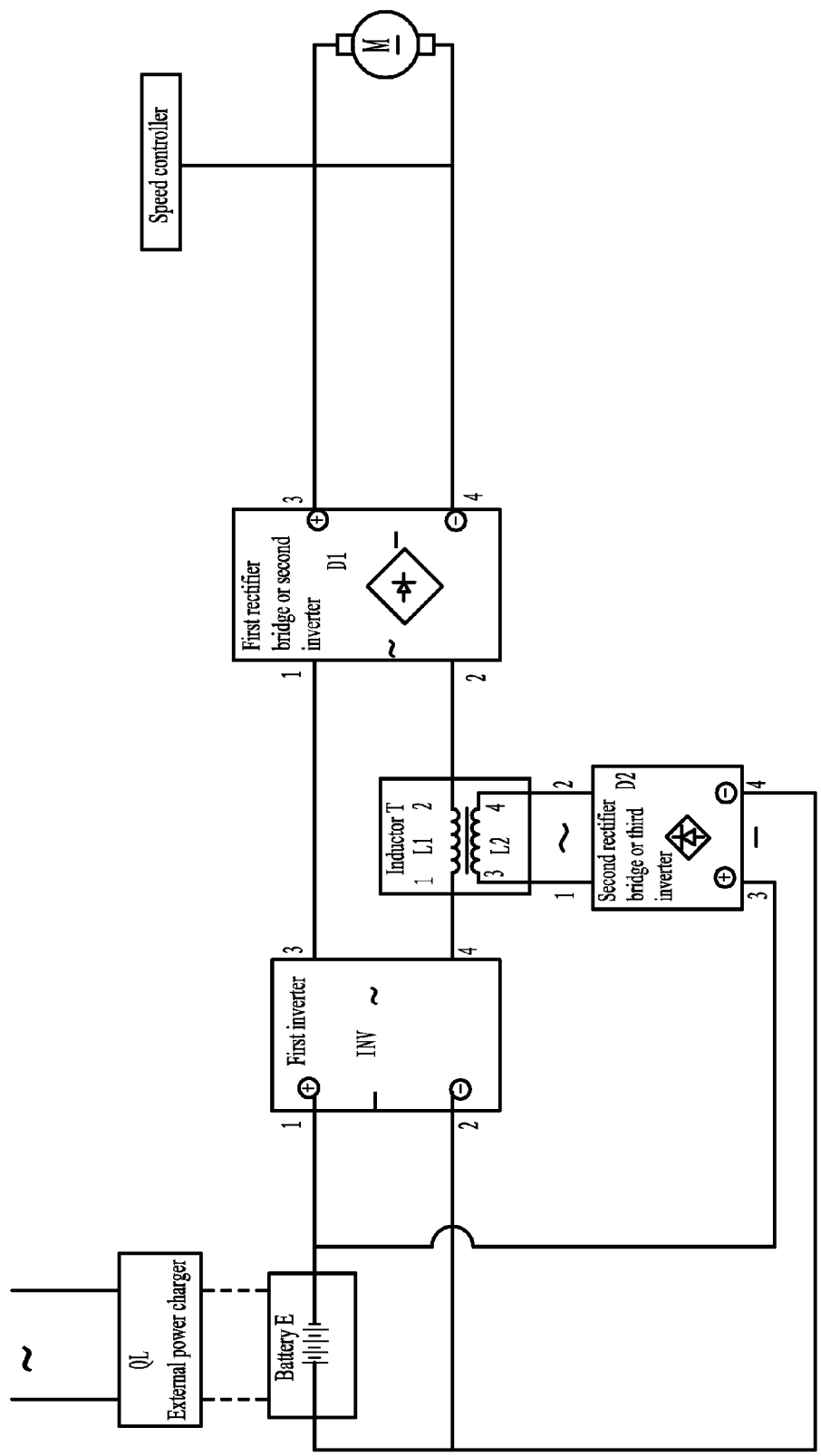

DEVICE FOR RECOVERING ELECTRIC ENERGY IN DC MOTOR-DRIVEN ELECTRIC VEHICLE

CROSS-REFERENCE TO RELATED APPLICATIONS

This application is a continuation-in-part of International Patent Application No. PCT/CN2011/081907 with an international filing date of Nov. 8, 2011, designating the United States, now pending, and further claims priority benefits to Chinese Patent Application No. 201110035958.0 filed Feb. 11, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a device for recovering electric energy in a DC motor-driven electric vehicle that employs an inductor to recover the electric energy in the process of current rectification. The invention is particularly applicable to electric bicycles, electric tricycles, electric cars, electric boats, household electric appliances, industrial electric appliances, and electric motor devices.

2. Description of the Related Art

A typical electric vehicle adopts a rectifier to compensate for its start and operation. However, the rectifier consumes a large amount of energy in the start and the operation of the electric vehicle, thereby resulting in an energy loss of a battery or the power grid. Although electric energy can be reserved by using a flywheel, a double-layer capacitance, or an electric generator, all these devices have a high energy consumption and low energy recovery efficiency thereby resulting in a high energy consumption of the electric vehicle.

SUMMARY OF THE INVENTION

In view of the above-described problems, it is one objective of the invention to provide a device for recovering electric energy in a DC motor-driven electric vehicle. The device employs an inductor to rectify the current and regulate the voltage. A primary coil of the inductor is in series connection with a load of a DC motor. When the DC motor works, the primary coil of the inductor produces an electromagnetic induction and influences a secondary coil of the inductor to produce an AC current and voltage on the secondary coil. The AC current and voltage is further rectified and inverted into a direct current by a rectifier bridge or an inverter, and the direct current is finally input to the battery for electric energy recovery. The recovery rate of the electric energy is 25% above.

To achieve the above objective, in accordance with one embodiment of the invention, there is provided a device for recovering electric energy in a DC motor-driven electric vehicle, the device comprising: a battery; a first inverter (a DC to AC inverter); an inductor; a first rectifier bridge (a high power diode rectifier bridge) or a second inverter (an AC to DC inverter); a DC motor; a second rectifier bridge (a high power diode rectifier bridge) or a third inverter (an AC to DC inverter); and a charger. An anode and a cathode of the battery are connected to input ends of the first inverter, respectively. One output end of the first inverter is connected to one end of a primary coil of the inductor. Another output end of the first inverter is connected to one input end of the first rectifier bridge or the second inverter. Another end of the primary coil of the inductor is connected to another input end of the first rectifier bridge. Output ends of the first rectifier bridge are connected to the DC motor. The speed of the AC motor is controlled by the speed controller. Output ends of a secondary coil of the inductor are connected to input ends of the second rectifier bridge or the third inverter, respectively. Output ends of the second rectifier bridge are connected to the anode and the cathode of the battery, respectively. The charger is connected to the anode and the cathode of the battery for supplying power from an external power supply.

In a class of this embodiment, the DC motor is provided with a commercially available speed controller for controlling a rotary speed of the DC motor.

In a class of this embodiment, the battery is a battery pack or a single battery. The battery comprises a power manager for management of charging and discharging of the battery. The power manager is a commercially available power manager module.

In a class of this embodiment, the inductor comprises: a magnetic core, a coil, a mounting bracket, a skeleton, and an insulating material. The magnetic core is made of a ferrite, a rare earth magnetic material, or a silicon steel sheet. The magnetic core uses a magnetic ring, a magnetic cylinder, and the like to form a magnetic circuit.

In a class of this embodiment, the coil is made of an enamel-covered wire or other insulating conductive material. The inductor is assembled by winding the coil on the skeleton, inserting the magnetic core inside the coil, fixing the coil on the mounting bracket, and using the insulating material for package.

Working principals of the invention is as follows:

The anode and the cathode of the battery output a direct current, which is inverted into an alternative current by the first inverter. One output end of the first inverter is connected to the primary coil of the inductor and the first rectifier bridge or the second inverter, respectively. Another output end of the first inverter is connected to the first rectifier bridge or the second inverter. An alternative current passing through the first rectifier bridge or the second inverter is converted to a direct current and is input to the DC motor to form a circuit. Thus, the DC motor is started. The speed of the DC motor is controlled by the speed controller.

During the running of the DC motor, the primary coil of the inductor produces a flux due to the current and the voltage, thereby rectifying the current and regulating the voltage. Meanwhile, an induced electromotive force is produced and further influences the secondary coil of the inductor, so that a voltage and a current are produced on the secondary coil of the inductor. The current is further rectified by the second rectifier bridge or the third inverter into a direct current that is reserved in the battery. Thus, the electric energy is recovered, and the recovery rate exceeds 25%. The amount of the recovered electric energy depends on the power consumption of the motor. The higher the power consumption of the motor, the larger current and the larger voltage produced on the secondary coil of the inductor.

When the battery does not have enough energy, the charger is connected to the anode and the cathode of the battery for supplying power.

Advantages of the invention are as follows:

The device for recovering the electric energy for the DC motor-driven electric vehicle of the invention has a reasonable design, compact structure, and is convenient in use. The device employs the battery for charging and discharging, thereby enabling the battery to have a good activation effect, prolonging the service life of the battery, and increasing the capacity of the battery. As the inductor having a magnetic inductance is in series connection with the motor, during the process of speed regulation, the power factor of the inductor is increased by exceeding 0.95, the efficiency exceeds 98%. The efficiency of the inductor is increased by 2%, and the loss of the inductor is reduced by ½.

The device of the invention employs the inductor to rectify the current and regulate the voltage. The primary coil of the inductor is in series connection with the load of the DC motor. When the DC motor works, the current and the voltage on the primary coil of the inductor produce an electromagnetic induction and influence the secondary coil of the inductor to produce the AC current and voltage on the secondary coil. The AC current and voltage is further rectified and inverted into a direct current by the second rectifier bridge or the third inverter, and the direct current is input to the battery for electric energy recovery. The recovery rate of the electric energy exceeds 25%.

BRIEF DESCRIPTION OF THE DRAWINGS

The invention is described hereinbelow with reference to accompanying drawings, in which the sole FIGURE is a structure diagram of a device for recovering electric energy in a DC motor-driven electric vehicle in accordance with one embodiment of the invention.

DETAILED DESCRIPTION OF THE EMBODIMENTS

As shown in FIG. 1, a device for recovering electric energy in a DC motor-driven electric vehicle, comprises: a battery E; a first inverter INV (a DC to AC inverter); an inductor T; a first rectifier bridge D1 (a high power diode rectifier bridge) or a second inverter (an AC to DC inverter); a DC motor M; a second rectifier bridge D2 (a high power diode rectifier bridge) or a third inverter (an AC to DC inverter); and a charger QL.

The DC motor is provided with a commercially available speed controller for controlling a rotary speed of the DC motor.

The battery is a battery pack or a single battery. The battery comprises a power manager for management of charging and discharging of the battery. The power manager is a commercially available power manager module.

An anode and a cathode of the battery E are connected to input ends 1, 2 of the first inverter INV, respectively. One output end 4 of the first inverter INV is connected to one end 1 of a primary coil L1 of the inductor. Another output end 3 of the first inverter is connected to one input end 1 of the first rectifier bridge D1 or the second inverter. Another end 2 of the primary coil L1 of the inductor is connected to another input end 2 of the first rectifier bridge D1. Output ends 3, 4 of the first rectifier bridge D1 are connected to the DC motor. The speed of the AC motor is controlled by the speed controller.

Output ends 3, 4 of a secondary coil L2 of the inductor are connected to input ends 1, 2 of the second rectifier bridge D2 or the third inverter, respectively. Output ends 3, 4 of the second rectifier bridge D2 are connected to the anode and the cathode of the battery E, respectively. The charger QL is connected to the anode and the cathode of the battery E for supplying power.

The inductor T comprises: a magnetic core, a coil, a mounting bracket, a skeleton, and an insulating material. The magnetic core is made of a ferrite, a rare earth magnetic material, or a silicon steel sheet. The magnetic core uses a magnetic ring, a magnetic cylinder, and the like to form a magnetic circuit. The coil is made of an enamel-covered wire or other insulating conductive material. The inductor is assembled by winding the coil on the skeleton, inserting the magnetic core inside the coil, fixing the coil on the mounting bracket, and using the insulating material for package.

The first rectifier bridge is commercially available.

The first inverter, the second inverter, and the third inverter are commercially available.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device for recovering electric energy in a DC motor-driven electric vehicle, the device comprising:
   a) a battery;
   b) a first inverter;
   c) an inductor, the inductor comprising a primary coil and a secondary coil;
   d) a first rectifier bridge or a second inverter;
   e) a DC motor;
   f) a second rectifier bridge or a third inverter; and
   g) a charger; wherein:
   an anode of the battery and a cathode of the battery are connected to input ends of the first inverter, respectively;
   one output end of the first inverter is connected to one end (1) of the primary coil;
   another output end of the first inverter is connected to one input end of the first rectifier bridge or the second inverter;
   another end of the primary coil is connected to another input end of the first rectifier bridge or the second inverter;
   output ends of the first rectifier bridge or the second inverter are connected to the DC motor;
   output ends of the secondary coil are connected to input ends of the second rectifier bridge or the third inverter, respectively;
   output ends of the second rectifier bridge or the third inverter are connected to the anode of the battery and the cathode of the battery, respectively;
   the inductor is employed to rectify the current of the device and regulate the voltage of the device;
   the primary coil is in series connection with the DC motor;
   the secondary coil is in series connection with the second rectifier bridge or the third inverter and the battery;
   when the DC motor works, the current on the primary coil and the voltage on the primary coil induce the secondary coil to produce an AC current and an AC voltage on the secondary coil, the AC current and the AC voltage are rectified and inverted into a direct current by the second rectifier bridge or the third inverter, and the direct current is input to the battery; and
   the charger is connected to the anode of the battery and the cathode of the battery.

2. The device of claim 1, wherein
   the inductor comprises: a magnetic core, a coil, a mounting bracket, a skeleton, and an insulating material; and
   the inductor is assembled by winding the coil on the skeleton, inserting the magnetic core inside the coil, fixing the coil on the mounting bracket, and using the insulating material for package.

3. The device of claim 2, wherein the coil is made of an enamel-covered wire or an insulating conductive material.

4. The device of claim 1, wherein the DC motor is provided with a speed controller for controlling a rotary speed of the DC motor.

5. The device of claim 1, wherein the battery is a battery pack or a single battery.

6. The device of claim 1, wherein the battery comprises a power manager for management of charging and discharging of the battery.

7. A device for driving a DC motor, the device comprising:
a) a battery;
b) a first inverter comprising a first input end, a second input end, a first output end, and a second output end;
c) an inductor, the inductor comprising a primary coil and a secondary coil, the primary coil comprising a first input end, a second input end, a first output end, and a second output end, the secondary coil comprising a first input end, a second input end, a first output end, and a second output end;
d) a second inverter, the second inverter comprising a first input end, a second input end, a first output end, and a second output end; and
e) a third inverter, the third inverter comprising a first input end, a second input end, a first output end, and a second output end; wherein:
an anode of the battery and a cathode of the battery are connected to the first input end of the first inverter and the second input end of the first inverter, respectively;
the first output end of the first inverter is connected to the first input end of the primary coil;
the second output end of the first inverter is connected to the first input end of the second inverter;
the second input end of the primary coil is connected to the second input end of the second inverter;
the first output end of the second inverter and the second output end of the second inverter are adapted to be connected to the DC motor;
the first output end of the secondary coil and the second output end of the secondary coil are connected to the first input end of the third inverter and the second input end of the third inverter, respectively;
the first output end of the third inverter and the second output end of the third inverter are connected to the anode of the battery and the cathode of the battery, respectively;
the primary coil is adapted to be in series connection with the DC motor; and
the secondary coil is in series connection with the third inverter and the battery.

8. The device of claim 7, further comprising a charger, wherein the charger is connected to the anode of the battery and the cathode of the battery.

9. The device of claim 8, wherein the battery comprises a power manager for management of charging and discharging of the battery.

10. The device of claim 7, wherein
the inductor comprises a magnetic core, a coil, a mounting bracket, a skeleton, and an insulating material; and
the inductor is assembled by winding the coil on the skeleton, inserting the magnetic core inside the coil, fixing the coil on the mounting bracket, and using the insulating material for package.

11. The device of claim 10, wherein the coil is an enamel-covered wire or an insulating conductive material.

12. The device of claim 7, further comprising a speed controller, wherein the speed controller is connected to the DC motor and is adapted to control a rotary speed of the DC motor.

* * * * *